Jan. 5, 1954  C. W. BRISTOL  2,664,917
APPARTUS FOR MEASURING ABSOLUTE PRESSURE
Filed April 26, 1947
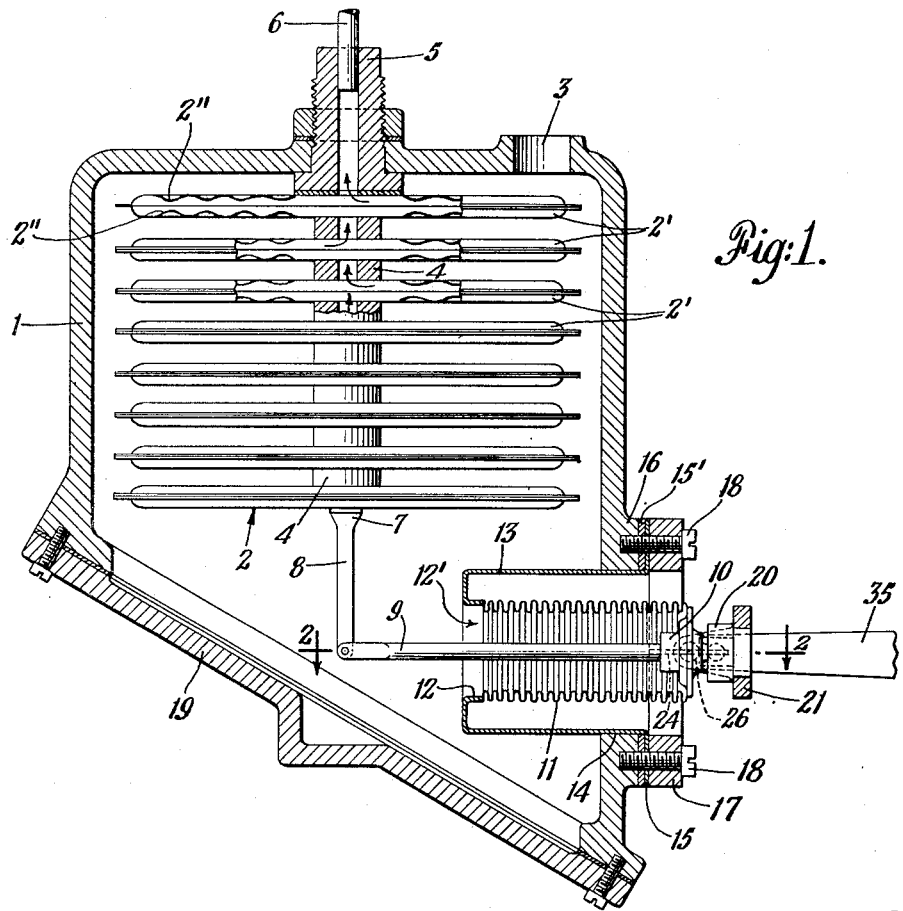
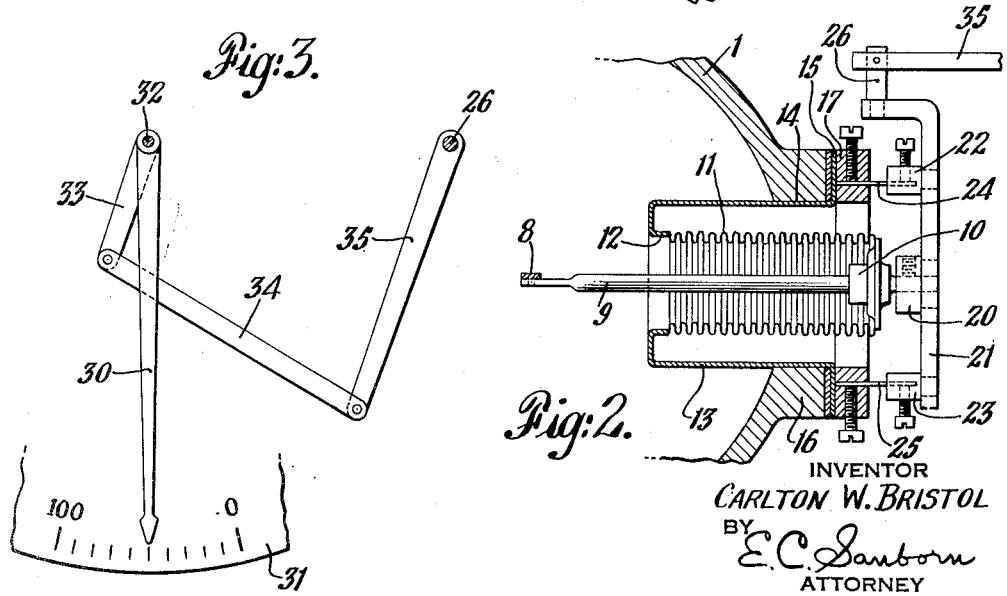
INVENTOR
CARLTON W. BRISTOL
BY
E. C. Sanborn
ATTORNEY

Patented Jan. 5, 1954

2,664,917

UNITED STATES PATENT OFFICE 2,664,917

APPARATUS FOR MEASURING ABSOLUTE PRESSURE

Carlton W. Bristol, Naugatuck, Conn., assignor to The Bristol Company, Waterbury, Conn., a corporation of Connecticut Application April 26, 1947, Serial No. 744,071

7 Claims. (Cl. 137—786)

This invention relates to the measurement of absolute pressure. An object is to provide novel apparatus, of simple construction, for the measurement of even very low absolute pressures with marked facility and precision.

Another feature of the invention resides in provisions for transmitting absolute pressure measurements from a highly sensitive pressure-responsive element within a casing, to an indicator member outside said casing, without interference from surrounding atmospheric conditions.

The invention also provides for especially precise transmission of the response of the pressure-sensitve element without objectionable frictional resistance, lost motion, or backlash of parts.

Other features and advantages of the invention will be hereinafter described and claimed.

In the accompanying drawings:

Fig. 1 is a vertical sectional view, with parts in elevation, illustrating an embodiment of the invention.

Fig. 2 is a horizontal sectional view, with parts in elevation, of a portion of the apparatus shown in Fig. 1, said veiw being taken on line 2—2 of Fig. 1.

Fig. 3 is a detail view illustrating connections from the apparatus of Figs. 1 and 2 for actuating an indicator element.

Referring to the drawings, a housing or casing 1 has mounted therein a suitable bellows 2 responsive to minute changes in pressure within said casing. The bellows is shown as of the aneroid type, suited to complete collapse, which has been found to be well suited for this purpose. An opening 3 in a wall of the casing 1 provides for connection of the interior of said casing through a suitable conduit too the source of the pressure to be measured.

The bellows 2 is shown as comprising a series of aneroid capsules 2' of resilient metal. Each capsule comprises a pair of metal walls integrally united by welding, or otherwise suitably sealed, along their meeting edges. The walls are preferably corrugated, as illustrated in the broken-away portion of the upper capsule 2'.

Between the respective capsules are spacer members 4, secured as by welding to adjacent walls of successive capsule units. It will of course be understood that the spacer members 4 are hollow and communicate with the interiors of the respective capsules to permit the same to be exhausted of air.

The upper wall of the uppermost capsule 2' is secured to a fitting 5 threaded through an opening in the top of the casing, to which fitting there is adapted to be applied a tube 6 for exhausting air from the series of capsules 2'. After said capsules have been exhausted of air, the tube 6 is sealed adjacent the fitting 5, as will be readily understood.

In the exhausting of the bellows 2, as the internal air pressure becomes progressively less, the walls of the bellows are more and more stressed by the pressure in the housing 1, until the opposing convolutions 2", 2" of each capsule 2 come into mutual engagement. This engagement of opposing convolutions takes place before the elastic limit of said bellows is reached. The bellows structure is thereby transformed into a group of concentric annular tubes, capable of withstanding external atmospheric pressure indefinitely without damage.

It will thus be seen that as long as the pressure in the housing 1 remains above the highest point of the operating range of the instrument, the bellows 2 remains completely collapsed, thus maintaining its walls in a state to effectively withstand the stress. Only as the pressure in the housing becomes sufficiently low to enter the measuring range will the convolutions 2" separate and the bellows revert to the conventional form. As the pressure in said housing becomes less and less, approaching a perfect vacuum, it more nearly approaches the internal, substantially zero, pressure within the bellows; and the expanding bellows walls more nearly approximate the condition under which the structure was originally assembled, with a minimum stress on the material. In short, the exhausted bellows 2 responds quickly and precisely to changes of pressure in the housing 1, within the desired subatmospheric operating range, and with minimum of unit stress in the bellows walls; and said bellows is furthermore capable of withstanding for prolonged periods atmospheric pressures in said housing, or other pressures substantially exceeding said operating range.

Secured to the bottom wall of the lowermost capsule 2' is the head 7 of a rod 8. The latter is pivoted at its other end to a rod 9 through which movements of the bellows 2 are to be transmitted to mechanism outside the casing 1.

The rod 9, which is actuated by the bellows 2 through the rod 8, passes through a fitting 10 to which said rod is secured. Said fitting 10 is sealed, as by welding, to an end of a flexible metal bellows 11 which in turn is sealed to the inner flange 12 of a cylindrical shell or tubular member 13 of metal or other suitable rigid material. Said shell 13 extends through an opening 14 in a wall of the casing 1, and is provided at its outer end with a flange 15 which seats upon a boss 16 surrounding said opening. Said shell is sealed to the casing by a ring 17 and by suitable screws 18 which pass through said ring and flange and thence into the boss 16. A suitable gasket 15' may be interposed between said boss and said flange 15.

When the unit comprising the bellows 11 and shell 13 is inserted into the opening 14, and the shell is secured to the boss 16 as above described, the link 8 may be connected to the bellows member 7 and to the rod 9. To facilitate insertion of said unit, as well as the bellows 2, and connection of said rod 9 to said link 8, the adjacent end of the casing 1 is provided with a removable cover 19.

After said unit comprising the bellows 11 and shell 13 has been inserted into the casing and secured to the boss 16, and after the casing cover 19 has been fastened in place, the interior of said casing is effectively sealed from the external atmosphere. The bellows 11 not only provides a flexible closure for the opening 12' within the flange 12 through which the rod 9 passes, but also permits movements of the bellows 2 to be transmitted with facility to the exterior of the casing 1.

The rod 9, as shown, projects beyond the fitting 10 and has fastened on its outer end a collar or boss 20 integral with an arm or lever 21. Extending from said lever are a pair of additional bosses 22, 23, each having a fine bore within which is tightly secured a piece of resilient wire, such as piano wire, 24, 25. The wires 24, 25 are in turn secured tightly in suitable openings in the ring 17. Through said wires 24, 25, the lever 21 is pivotally mounted on said ring 17 for movement in response to expansion and contraction of the pressure-responsive bellows 2.

The bellows 11 is of any suitable thin flexible metal or other material having a low-spring rate as compared with that of the pressure-responsive bellows 2. In other words, the bellows 11 offers only slight resistance to deflection of the bellows 2 and thus does not substantially retard response of bellows 2 to very slight changes in the pressure within the casing 1.

It will be apparent that movement of the pressure-responsive bellows 2 will be transmitted through the rod 9 to rock the lever 21 through a corresponding angle, about a virtual axis intermediate the ends of the wires 24, 25.

For example, expansion of the bellows 2 will move the left hand end 9 of the rod 9 downwardly in Fig. 1, and thus will cause the lever 21 to turn counterclockwise about its virtual axis. Conversely, contraction of the bellows 2 acts through the rod 9 to turn the lever 21 clockwise as viewed in Fig. 1. Said lever, in short, will be turned in one direction or the other, depending upon the direction of response of the bellows 2, and will assume a position corresponding to the magnitude of the pressure in the casing 1. During movement of the rod 9 and lever 21, the bellows 11 flexes to accommodate itself to the new positions of those elements.

Any suitable means may be provided for transmitting the movements of the lever 21 to a suitable indicator, pen arm, or control element. In Fig. 3, an indicator 30 is shown cooperating with a scale 31. Secured to the member 30 for rotation about the same axis 32 is an arm 33, which is connected by a link 34 to another lever arm 35 fastened to the stud 26 of the lever 21. Thereby, movement of said lever 21 is transmitted through said arm 35 to produce corresponding, though greatly magnified, movement of the indicator 30 along the scale 31.

It will thus be seen that I have provided simple and effective means for responding to minute changes in absolute pressure within the casing 1 and for transmitting the magnitudes of that pressure to a point outside said casing. The bellows 11 prevents exterior air from entering the casing 1, while at the same time effectively enabling movements of the pressure-responsive bellows 2 to be transmitted to the lever 21.

The provision of the wires 24, 25, forming the pivotal connection between lever 21 and the casing, presents the advantage of substantial elimination of friction, lost-motion, and backlash encountered with pivot bearings. Furthermore, it avoids the side thrusts which would arise in pivot bearings in the event of the occurrence of any twists in the sealing bellows during operation thereof by movements of the rod 9 and lever 21.

While my invention has pronounced advantages in the measurement of low absolute pressures, below atmospheric pressure, its utility is not restricted to such low pressures. It is also advantageous in the measurement of absolute pressures above atmospheric pressure. When the apparatus disclosed is intended for the measurement of absolute pressures above atmospheric pressure, the capsules of the bellows 2 may be constructed so that the opposing convolutions thereof will come into contact with each other under a predetermined pressure greater than atmospheric, before the elastic limit of the capsule is exceeded.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. An absolute pressure measuring device comprising a housing adapted for connection to a source of pressure to be measured, an opening in said housing, a bellows mounted at one of its ends in said housing responsive to the magnitude of the pressure therein, a rod connected to said pressure-responsive bellows at the end opposite its mounting and extending through said opening in said housing to a point outside the latter, a flexible closure for said opening comprising a bellows having an end wall sealed to said rod, said bellows being also sealed at its opposite end to a portion of said housing, an arm extending transversely of said rod and connected thereto outside said housing for movement by said rod to positions corresponding with those of said pressure-responsive bellows, and pivot means for said arm comprising resilient wires projecting therefrom on opposite sides of said rod and connected to a portion of said housing for providing a virtual axis for said arm adjacent said end wall of the second-mentioned bellows.

2. An absolute pressure measuring device comprising a housing adapted for connection to a source of pressure to be measured, an opening in a wall of said housing, a bellows mounted at one of its ends in said housing responsive to the magnitude of the pressure therein, a tubular member mounted in said opening in said housing wall, said member having a flange overlying a portion of said wall, means comprising a ring overlying said flange for securing said tubular member to said wall, a rod connected to said pressure-responsive bellows at the end opposite its mounting and extending through said tubular member to a point outside said housing, a bellows sealed at one end to said rod and at another to a portion of said tubular member for sealing the interior of said housing from the external atmosphere, an arm having resilient wires at opposite ends extending into said ring for pivotally mounting said arm, said arm being secured to said rod intermediate the ends of said arm for operation by said rod through extents commensurate with movements of said pressure-responsive bellows.

3. An absolute pressure measuring device comprising a housing adapted for connection to a source of pressure to be measured, an opening in a wall of said housing, a bellows mounted at one of its ends in said housing responsive to the magnitude of the pressure therein, a tubular member mounted in said opening in said housing wall, said member having a flange overlying a portion of said wall, means comprising a ring overlying said flange for securing said tubular member to said wall, a rod connected to said pressure-responsive bellows at the end opposite its mounting and extending through said tubular member to a point outside said housing, a bellows sealed at one end to said rod and at another to a portion of said tubular member for sealing the interior of said housing from the external atmosphere, an arm having resilient wire means extending therefrom into said ring for pivotally mounting said arm, and means connecting said arm to said rod for operation thereby through extents commensurate with movements of said pressure-responsive bellows.

4. An absolute pressure measuring device comprising a housing adapted for connection to a source of pressure to be measured, an opening in said housing, a bellows mounted at one of its ends in said housing responsive to the magnitude of the pressure therein, a rod connected to said pressure-responsive bellows at the end opposite its mounting and extending through said opening in said housing to a point outside the latter, a flexible closure for said opening comprising a bellows sealed at one end to said rod for movement therewith and having its opposite end connected to a portion of said housing, an arm connected to said rod outside said housing for movement by said rod to positions corresponding with those of said pressure-responsive bellows, and pivot means for said arm comprising resilient wires projecting therefrom on opposite sides of said rod to provide a virtual axis for said arm adjacent the movable end of the second mentioned bellows.

5. An absolute pressure measuring device comprising a housing adapted for connection to a source of pressure to be measured, an opening in said housing, a bellows mounted at one of its ends in said housing responsive to the magnitude of the pressure therein, a rod connected to said pressure-responsive bellows at the end opposite its mounting and extending through said opening in said housing to a point outside the latter, a flexible closure for said opening comprising a bellows having an end wall sealed to said rod for movement therewith and having its opposite end connected to a portion of said housing, an arm outside said housing means connecting said rod to the first-mentioned bellows for imparting rocking movement thereto and to the end of the second mentioned bellows attached to said rod in response to movement of the first mentioned bellows, resilient wire means extending from said housing to said arm for mounting said arm for pivotal movement about an axis adjacent the movable end of the second mentioned bellows, said arm being connected to said rod for movement thereby to positions corresponding to those of said pressure-responsive bellows.

6. An absolute pressure measuring device comprising a housing adapted for connection to a source of pressure to be measured, an opening in said housing, a bellows mounted at one of its ends in said housing responsive to the magnitude of the pressure therein, a rod connected to said pressure-responsive bellows at the end opposite its mounting and extending through said opening in said housing to a point outside the latter, a flexible closure for said opening comprising a bellows sealed at one end to said rod and having its opposite end connected to a portion of said housing, an arm outside said housing, resilient wires at opposite ends of said arm for mounting the latter for pivotal movement about a virtual axis adjacent the movable end of the second mentioned bellows, said arm being secured to said rod intermediate said wires for operation by said rod through extents corresponding to movements of said pressure-responsive bellows.

7. An absolute pressure measuring device comprising a housing adapted for connection with a source of pressure to be measured, an opening in said housing, a bellows mounted at one of its ends in said housing responsive to the magnitude of the pressure therein, a rod connected to said pressure-responsive bellows at the end opposite its mounting and extending through said opening in said housing to a point outside the latter, a flexible closure for said opening comprising a bellows having an end wall sealed to said rod, said bellows being also sealed at its opposite end to a portion of said housing, a connection between said rod to the first-mentioned bellows whereby movement of said bellows imparts rocking movement to said rod and the end of the second-mentioned bellows attached thereto, an arm outside said housing extending transversely to said rod and connected thereto for movement by said first-mentioned bellows, and pivot means supporting said arm and comprising resilient wires projecting from said arm on opposite sides of said rod.

CARLTON W. BRISTOL.

References Cited in the file of this patent

UNITED STATES PATENTS

| Number | Name | Date |
|---|---|---|
| 1,006,100 | Kent | Oct. 7, 1911 |
| 1,378,118 | Jacobsen | May 17, 1921 |
| 1,624,736 | Hutt | Apr. 12, 1927 |
| 2,079,069 | Johnson | May 4, 1937 |
| 2,155,950 | Nallinger | Apr. 25, 1939 |
| 2,162,308 | Jenny | June 13, 1939 |
| 2,311,900 | Newell | Feb. 23, 1943 |
| 2,366,897 | Grooms | Jan. 9, 1945 |
| 2,441,882 | Hicks | May 18, 1948 |
| 2,477,233 | Bristol | July 26, 1949 |
| 2,506,694 | Watson | May 9, 1950 |
| 2,514,059 | Hicks | July 4, 1950 |